Nov. 30, 1965        M. E. BROGDEN ETAL        3,221,064
PURIFICATION PROCESS FOR CRUDE DINITROTOLUENES
Filed Dec. 28, 1964
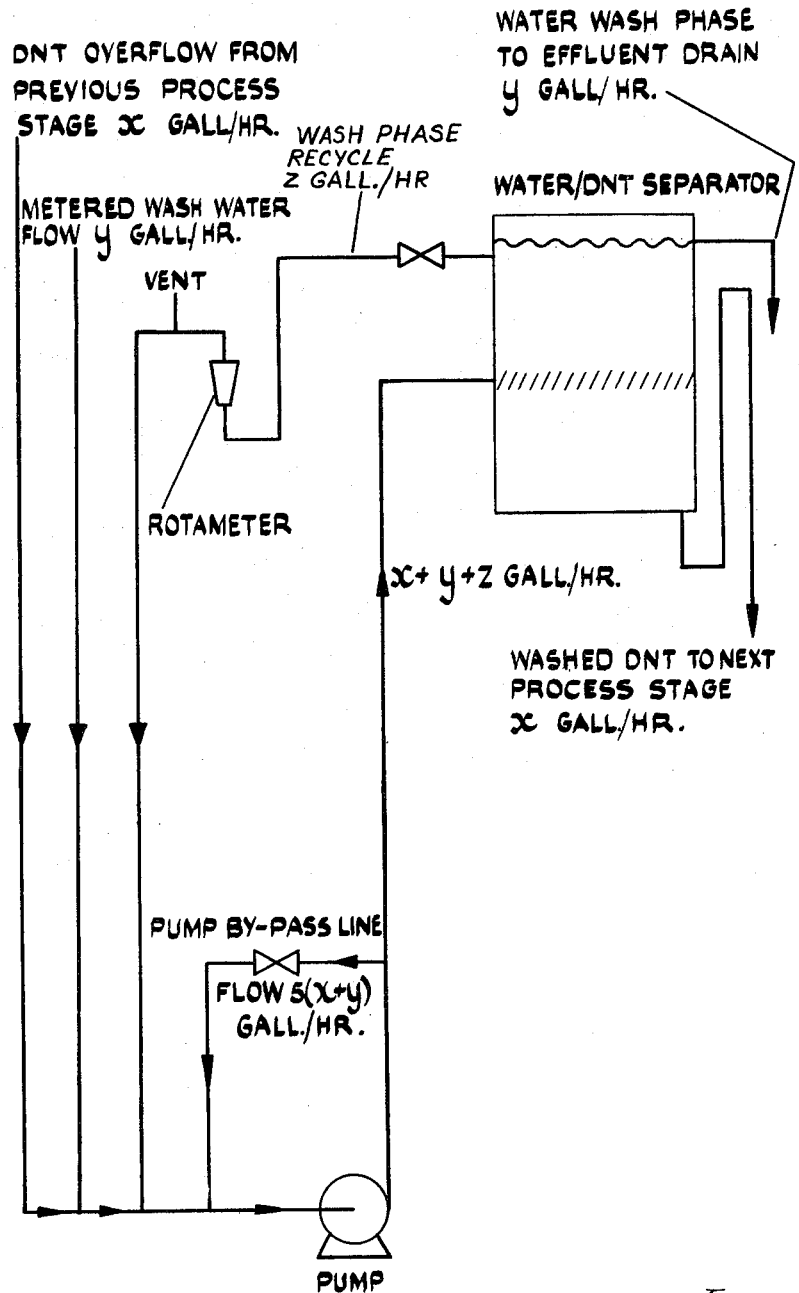
INVENTORS
MICHAEL EDWARD BROGDEN
GEORGE MILNES
HARRY PINKERTON
BY
Cushman, Darby & Cushman
ATTORNEYS 3,221,064
PURIFICATION PROCESS FOR CRUDE DINITROTOLUENES
Michael Edward Brogden, George Milnes, and Harry Pinkerton, all of Manchester, England, assignors to Imperial Chemical Industries Limited, London, England, a corporation of Great Britain
Filed Dec. 28, 1964, Ser. No. 421,351
Claims priority, application Great Britain, Jan. 8, 1964, 883/64
3 Claims. (Cl. 260—645)

This invention relates to the purification of dinitrotoluenes.

Dinitrotoluenes are usually obtained by nitrating toluene with a mixture of nitric and sulphuric acids, the crude reaction product consisting of two phases, an upper layer of isomeric dinitrotoluenes and a lower acid layer containing about 2.5% of dissolved dinitrotoluenes. After separation of the crude dinitrotoluenes from the reaction mixture for example by decantation and/or extraction with solvents further purification is necessary to remove by-products and acidic impurities.

According to the present invention we provide a process for purifying crude dinitrotoluenes by contacting the dinitrotoluenes with water in a centrifugal pump, employing from 0.5 part to 2.0 parts by volume of water per part by volume of dinitrotoluenes, separating the dinitrotoluenes from the water washings, thereafter contacting the dinitrotoluenes in a centrifugal pump with dilute aqueous sodium hydroxide solution employing from 0.1 part to 0.5 part by volume of sodium hydroxide solution per part of dinitrotoluenes, separating the dinitrotoluenes from the sodium hydroxide solution and thereafter washing the dinitrotolulenes with water.

It is found convenient to employ a centrifugal pump for the first water wash and the sodium hydroxide wash, as a very intimate mixing of the dinitrotoluenes with the washing liquors is thereby obtained. Suitable centrifugal pumps are those for example described in engineering literature as single stage centrifugal pumps. The dinitrotoluenes and washing liquor are passed together through the pump which may also circulate the mixture round a by-pass and are subjected to high shearing forces due to the turbulent motion in the by-pass and the rotation of the pump impeller which ordinarily operates at tip speeds of from 5 to 75 ft./sec. Ratios of by-pass flow to net throughput are ordinarily in the range 1:1 to 10:1.

A suitable by-pass arrangement is represented in the accompanying drawing which is a flow sheet illustrating the use of a pump and by-pass circuit for the water washing of dinitro-toluenes (DNT). Crude DNT is fed at the rate of $x$ gallons per hour, together with $y$ gallons per hour of fresh water and $z$ gallons per hour of recycled wash water to the intake of a centrifugal pump. There is a flow of $5(x+y)$ gallons per hour round the by-pass of the pump, and $(x+y+z)$ gallons per hour of mixed wash water and DNT leave the pump circuit to enter a continuous DNT/water separator. $x$ gallons of washed DNT leave the separator per hour, separate from $y$ gallons of water per hour, $z$ gallons of wash water per hour being returned to the pump circuit.

Initially an emulsion of the liquids is obtained but provided the above-mentioned volume ratios are adhered to rapid separation of the phases occurs and the dinitrotoluenes can be separated from the washing liquors by use for example of a continuous decanter. For the second washing step which is performed after the alkaline washing step use of a centrifugal pump is usually not satisfactory as deemulsification cannot readily be brought about irrespective of the volume relationship between the phases.

The process of the present invention is performed within the temperature range 60° C. to 80° C. to maintain the dinitrotoluenes in the liquid condition. For the sodium hydroxide washing step the dilute aqueous sodium hydroxide solution is preferably employed at a concentration of from 0.7 to 1.3% by weight.

A preferred embodiment of the present invention is described in the following example:

*Example*

104 gallons per hour of dinitrotoluenes at 70° C. are fed together with 105 gallons per hour of water at 70° C. to the inlet of a 1000 gallons per hour single stage centrifugal pump running with its by-pass line partly open. The mixture from the pump outlet is separated in a continuous decanter into a water wash phase and a dinitrotoluene phase. The latter is fed together with 20 gallons per hour of 1% NaOH solution at 70° C. to the inlet of a 600 gallons per hour centrifugal pump running with its by-pass fully open. The caustic soda wash liquor phase and dinitrotoluene phase from the pump outlet are separated in a continuous decanter. The dinitrotoluenes phase is subsequently washed with 30 gallons per hour water at 70° C. by feeding continuously through a stirred vessel and separating the phases in a continous decanter.

What we claim is:

1. A process for purifying crude dinitrotoluenes by contacting the liquid dinitrotoluenes with water in a centrifugal pump, employing from 0.5 part to 2.0 parts by volume of water per part by volume of dinitrotoluenes, separating the dinitrotoluenes from the water washings, thereafter contacting the dinitrotoluenes, in a centrifugal pump with dilute aqueous sodium hydroxide solution empolying from 0.1 part to 0.5 part by volume of sodium hydroxide solution per part of dinitrotoluenes, separating the dinitrotoluenes from the sodium hydroxide solution and thereafter washing the dinitrotoluenes with water.

2. Processing according to claim 1 wherein the dinitrotoluenes and washing liquor are passed together through the pump which also circulates the mixture round a by-pass, the ratio of by-pass flow to net throughout being in the range 1:1 to 10:1.

3. Process according to claim 1 wherein the dilute aqueous sodium hydroxide solution is preferably employed in the sodium hydroxide washing step at a concentration of from 0.7 to 1.3% by weight.

References Cited by the Examiner
UNITED STATES PATENTS

| 2,040,123 | 5/1936 | Coward | 260—645 |
| 3,132,184 | 5/1964 | Hyman et al. | 260—645 |

REUBEN EPSTEIN, *Primary Examiner.*
CARL D. QUARFORTH, *Examiner.*